(12) United States Patent
Felder

(10) Patent No.: US 7,967,888 B2
(45) Date of Patent: Jun. 28, 2011

(54) FILTRATION PLATE FOR A PARTICLE FILTER

(75) Inventor: Hubert Felder, Holzwickede (DE)

(73) Assignee: Daimler AG, Stuttgart (DE)

( * ) Notice: Subject to any disclaimer, the term of this patent is extended or adjusted under 35 U.S.C. 154(b) by 675 days.

(21) Appl. No.: 11/667,455

(22) PCT Filed: Nov. 8, 2005

(86) PCT No.: PCT/EP2005/011906
§ 371 (c)(1),
(2), (4) Date: Mar. 14, 2008

(87) PCT Pub. No.: WO2006/050894
PCT Pub. Date: May 18, 2006

(65) Prior Publication Data
US 2008/0276585 A1    Nov. 13, 2008

(30) Foreign Application Priority Data
Nov. 10, 2004    (DE) .................... 10 2004 054 158

(51) Int. Cl.
*B01D 39/06* (2006.01)
*B01D 39/14* (2006.01)
*B01D 39/00* (2006.01)
(52) U.S. Cl. .................. 55/523; 55/522; 55/524
(58) Field of Classification Search ............. 55/522–524
See application file for complete search history.

(56) References Cited

U.S. PATENT DOCUMENTS

| 3,531,920 | A | * | 10/1970 | Hart ............................. 55/497 |
| 4,268,290 | A | * | 5/1981 | Barrington ................. 55/521 |
| 5,066,400 | A | * | 11/1991 | Rocklitz et al. ............ 210/493.5 |
| 5,215,724 | A |  | 6/1993 | Haerle |
| 5,405,423 | A | * | 4/1995 | Haerle ......................... 55/523 |
| 5,853,902 | A |  | 12/1998 | Usui |
| 2004/0231306 | A1 | * | 11/2004 | Neumann et al. ............. 55/523 |
| 2009/0211214 | A1 | * | 8/2009 | Felder et al. ................. 55/485 |

FOREIGN PATENT DOCUMENTS

| DE | 40 29 749 A1 | 9/1990 |
| DE | 40 22 321 A1 | 1/1992 |

(Continued)

OTHER PUBLICATIONS

International Search Report dated Feb. 14, 2006.

*Primary Examiner* — Walter D Griffin
*Assistant Examiner* — Amber Orlando
(74) *Attorney, Agent, or Firm* — Crowell & Moring LLP

(57) ABSTRACT

A filtration plate (1, 1') for a particle filter which serves to separate particles from an exhaust gas flow of an internal combustion engine is composed of a gas-permeable carrier material which is coated with sintered metal powder, and has a surface region (2) which extends substantially in one plane and on which at least one spacer element (3, 3') is situated. The at least one spacer element (3, 3') has an inner elevation (9) or depression (9') which extends away from the surface region (2) in one direction, and an outer depression (10) or elevation (10') which surrounds the inner elevation (9) or depression (9') at least partially and extends away from the surface region (2) in the opposite direction to the inner elevation (9) or depression (9').

10 Claims, 1 Drawing Sheet

FOREIGN PATENT DOCUMENTS

| | | |
|---|---|---|
| DE | 42 34 930 A1 | 10/1992 |
| DE | 195 03 067 A1 | 8/1996 |
| DE | 198 10 738 C1 | 12/1998 |
| DE | 101 08 769 A1 | 2/2001 |
| DE | 101 28 938 A1 | 1/2003 |
| EP | 0470365 | 7/1991 |
| EP | 0 593 004 B1 | 10/1993 |
| WO | WO 00/70206 | 11/2000 |
| WO | WO 02/102494 A1 | 12/2002 |
| WO | WO02102492 | * 12/2002 |

* cited by examiner

FILTRATION PLATE FOR A PARTICLE FILTER

CROSS-REFERENCE TO RELATED APPLICATIONS

This application is a national stage of PCT International Application No. PCT/EP2005/011906, filed Nov. 8, 2005, which claims priority under 35 U.S.C. §119 to German Application No. 10 2004 054 158.2, filed Nov. 10, 2004, the entire disclosures of which are expressly incorporated by reference herein.

BACKGROUND AND SUMMARY OF THE INVENTION

The invention relates to a filtration plate for a particle filter which serves to separate particles from an exhaust gas flow of an internal combustion engine. Furthermore, the invention relates to a particle filter for separating particles from an exhaust gas flow of an internal combustion engine.

German patent document DE 42 34 930 A1 discloses a filter for separating contaminants from exhaust gases. The filter has a filter body having a multiplicity of filtration plates. The filter plates are composed of sintered metal powder and are arranged in such a way that they form a multiplicity of flow channels which lie next to one another. The individual filtration plates are stamped in a wave shape and are flowed through in the longitudinal direction. This wave shape of the filtration plates leads to longitudinal channels which are delimited in each case with respect to one another, and which can become clogged with ash very quickly and impair the action of the filter. Furthermore, the channels which are stamped in such a way result in a highly directed flow which prevents a distribution above the plane of the filtration plates and therefore leads to an increased exhaust gas back pressure. A further disadvantage of the known filtration plates lies in their low rigidity which makes handling considerably difficult and which can impair their service life.

International patent application publication no. WO 02/102494 A1 discloses a further particle filter. Here, a plurality of filter pockets are arranged in a star shape around the circumference of a central hole. The filter pockets have a triangular cross section into which a spacer element is inserted. The space element is intended to prevent a deformation of the filter pockets as a result of the exhaust gas pressure. This spacer element which is also called a "spacer" is, however, an additional component which represents an additional expenditure during the manufacture of the particle filter. Furthermore, it must be ensured in the design of the spacer element that it does not represent an obstacle for the exhaust gas flow, as it would otherwise cause an increase in the exhaust gas back pressure.

In the particle filter according to German patent document no. DE 101 28 938 A1, the filtration plates have respective embossments which are intended to make the filtration plates support one another.

The filter plates are usually installed into a filter housing as a filter body with a defined pre-stress and, in a horizontal installation position. Because the filtration plates are additionally pressed together by their inherent weight and by the exhaust gas pressure, the space which is situated between the filtration plates can become smaller very easily and can even be eliminated completely. This can result in considerable impediment to the flow, which cannot be prevented reliably even with the solution according to German patent document no. DE 101 28 938 A1.

It is therefore an object of the present invention to provide a filtration plate for a particle filter such that, when the filtration plate forms an inflow or outflow channel with a further filtration plate, there is always an intermediate space which is sufficient for satisfactory throughflow. Furthermore, the design of the filtration plate preferably represents a small obstacle for the exhaust gas flow.

These and other objects and advantages are achieved by the filtration plate according to the invention, which utilizes a spacer element having an inner elevation or depression which extends away from the surface region, and an outer depression or elevation which surrounds the inner elevation or depression and extends away from the surface region in the opposite direction to the inner elevation or depression. This results in a spacer element which extends on both sides of the surface region of the filtration plate. Thus, if two or more of these filtration plates are combined to form a filter body, mutual contact of the spacer elements is always ensured. In this way, filter plates which are arranged adjacently to one another are prevented from being pressed together, and the ability for throughflow of the filtration plates is ensured at all times.

This is true, in particular, when a multiplicity of spacer elements are distributed over the surface region.

Here, a spacer element is understood to encompass a defined region of a respective filtration plate, which maintains a spacing of the adjacent filtration plates on account of its structure.

According to one embodiment of the invention, a plurality of filtration plates which are arranged next to one another and define a particle filter for separating particles from an exhaust gas flow of an internal combustion engine.

A particle filter of this type utilizes all the advantages of the filtration plate according to the invention, with the result that the ability for flowthrough of the inflow and outflow channels is always ensured.

In one embodiment of the particle filter according to the invention, the spacer elements can be arranged on the filtration plates in such a way that the spacer elements of adjacent filtration plates are in mutual contact, and such that the filtration plates have an arrangement with respect to one another whereby an inner elevation of one filtration plate contacts the inner depression of the adjacent filtration plate, or an outer depression of one filtration plate contacts the outer elevation of the adjacent filtration plate.

A configuration of this type ensures that the abovementioned advantages of the filtration plates according to the invention are utilized advantageously by the particle filter according to the invention.

Other objects, advantages and novel features of the present invention will become apparent from the following detailed description of the invention when considered in conjunction with the accompanying drawings.

DETAILED DESCRIPTION OF THE DRAWINGS

Figure 1:
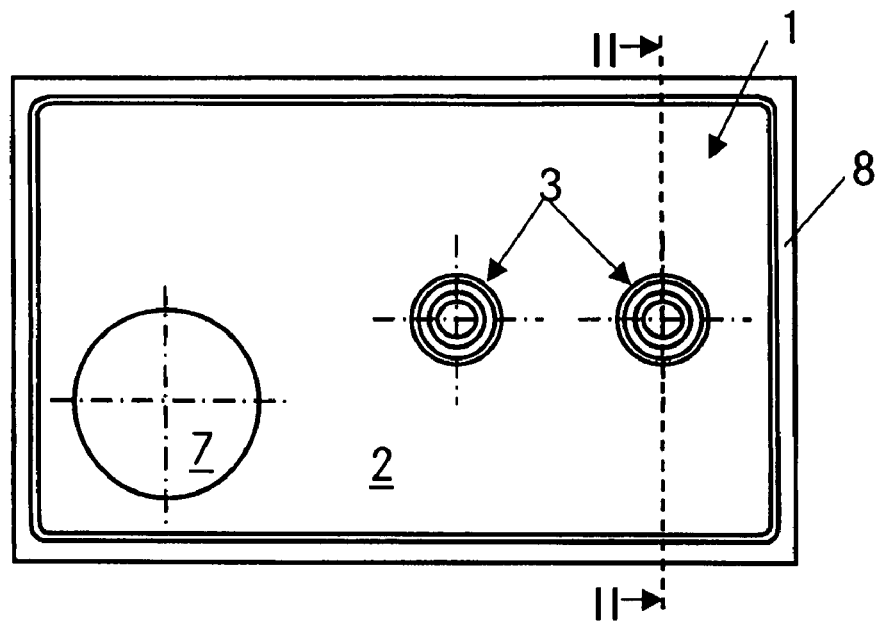
FIG. 1 is a plan view of a filtration plate according to the invention.

FIG. 1 shows a filtration plate 1 used to form a particle filter which is (not shown in its entirety) that separates particles from an exhaust gas flow of an internal combustion engine. The particle filter is preferably situated with an exhaust gas system of the internal combustion engine. The location of the particle filter during use, and the method of operation of a particle filter of this type are described in principle in German patent document no. DE 42 34 930 A1.

Figure 2:
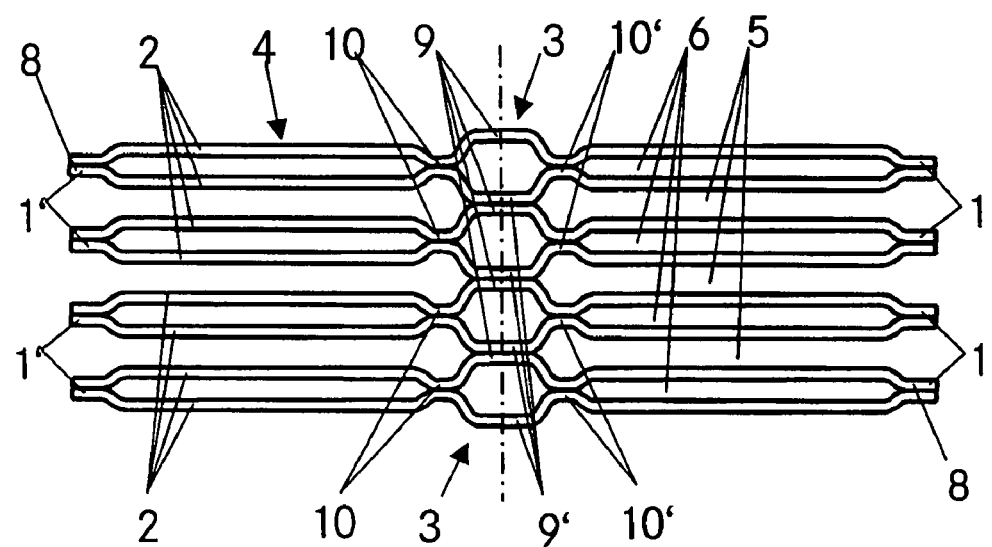
FIG. 2 is a section according to the line II-II from FIG. 1.

The filtration plate 1 is composed substantially of a gas-permeable carrier material which is coated with sintered metal powder, and has a surface region 2 which extends substantially in one plane, namely in the plane of the drawing. As shown in FIG. 2, when two or more filtration plates 1 are arranged above or next to one another, in order to establish a spacing between adjacent filtration plates 1 and prevent undesired contact between them during operation of the particle filter, a plurality of spacer elements 3 are provided on the surface region 2. The construction of the spacer elements will be explained in the following text with reference to FIG. 2. As many spacer elements 3 as desired can be arranged over the surface region 2 of the filtration plates 1. It is also possible to combine these spacer elements 3 with further spacer elements, which are not described in greater detail in this document. FIG. 2 shows a part of a filter body 4 which is formed by parallel rows or layers of individual filtration plates 1 and 1' and which forms the particle filter together with further components which are known and therefore not shown.

Filtration plates 1 and 1' are configured in a mirror-symmetrical manner to one another and define alternating inflow channels 5 and an outflow channels 6. The alternating inflow channels 5 and outflow channels 6 are also called filter pockets. Due to passage of the exhaust gas flow from one of the inflow channels 5 through a filtration plate 1 or 1' into one of the outflow channels 6, particles, in particular soot particles, can be separated from the exhaust gas flow. In order to make inflow of the exhaust gas flow possible between the filtration plates 1 and 1' and, at the same time, permit outflow only through one hole 7, which is shown in FIG. 1, the outflow channels 6 are connected to one another at edges 8 of the filtration plates 1. This connection can preferably be performed by welding, for example TIG welding.

In the following explanation of the construction of the spacer elements 3, reference is made first to the filtration plate 1, which is arranged at the top in FIG. 2. It can be seen FIG. 1 that the spacer element 3 has an inner elevation 9 which extends upwardly away from the surface region 2, and an outer depression 10 which surrounds the inner elevation 9 and extends downwardly away from the surface region 2. That is to say, the outer depression extends away from the surface region in a direction opposite to the inner elevation 9. As can be seen in FIG. 1, the outer depression 10 surrounds the inner elevation 9 over its entire circumference and has a substantially annular configuration, whereas the inner elevation 9 has a substantially circular configuration. According to an alternate embodiment, the outer depression 10 surrounds the inner elevation 9 only partially. Furthermore, other shapes of the inner elevation 9 and the outer depression 10 are also conceivable.

The outer depression 10 adjoins the inner elevation 9 directly, with the result that, starting from the inner elevation 9, the mean level of the surface region 2 is only reached again outside the outer depression 10.

The filtration plate 1' which is arranged below the upper filtration plate 1 has a spacer element 3' which is configured in a mirror-symmetrical manner with respect to the spacer element 3 of the filtration plate 1. The spacer element 3' therefore has an inner depression 9' which extends away from the surface region 2' downward, and an outer elevation 10' which extends away from the surface region 2' upward, that is to say, in an opposite direction to the inner depression 9'. The outer elevation 10' also surrounds and directly adjoins the inner depression 9' over its entire circumference. Furthermore, the inner depression 9' has a substantially circular configuration and the outer elevation 10' has a substantially annular configuration.

In order for it to be possible to utilize the above-described configuration of the filtration plates 1 and 1' in such a way that a constant height of the inflow channels 5 and the outflow channels 6 is ensured even during the use of the particle filter, the spacer elements 3 and 3' are arranged on the filtration plates 1 and 1' in such a way that the spacer elements 3 and 3' of adjacent filtration plates 1 and 1' are in mutual contact. In FIG. 2, the outer depression 10 of the upper filtration plate 1 and the outer elevation 10' of the filtration plate 1' which lies underneath are in contact, with the result that the rigidity of the upper outflow channel 6 is ensured. In contrast, in the second filtration plate 1', the inner depression 9' of the upper filtration plate 1' and the inner elevation 9 of the filtration plate 1 which lies underneath are in contact from above and from the filtration plate 1 which lies underneath. In the inflow channel 5 which is formed by these two filtration plates 1' and 1, the rigidity is therefore ensured by the inner depression 9' and the inner elevation 9. The same is also true for the filtration plates 1 and 1' which lie underneath and in each case alternately form the inflow channels 5 and the outflow channels 6 of the filter body 4.

All of the above-mentioned references are herein incorporated by reference in their entirety to the same extent as if each individual reference was specifically and individually indicated to be incorporated herein by reference in its entirety.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A filtration plate for a particle filter for separating particles from an exhaust gas flow of an internal combustion engine, said filtration plate comprising a gas-permeable carrier material which is coated with sintered metal powder, and has a surface region which extends substantially in one plane and on which at least one spacer element is situated; wherein,
   the at least one spacer element comprises an inner elevation or depression which extends away from the surface region in a first direction, and an outer depression or elevation which surrounds the inner elevation or depression and extends away from the surface region in a second direction, and
   the second direction is opposite to the first direction.

2. The filtration plate as claimed in claim 1, wherein the outer depression or elevation surrounds the inner elevation or depression entirely.

3. The filtration plate as claimed in claim 2, wherein:
   the inner elevation or depression has a substantially circular configuration;
   the outer depression or elevation has a substantially annular configuration; and
   the inner elevation or depression and the outer elevation or depression are situated concentrically to each other.

4. The filtration plate as claimed in claim 1, wherein the outer depression or elevation adjoins the inner elevation or depression directly.

5. The filtration plate as claimed in claim 1, wherein a multiplicity of spacer elements are distributed over the surface region.

6. A particle filter for separating particles from an exhaust gas flow of an internal combustion engine, said particle filter having a plurality of filtration plates as claimed in claim 1, said filtration plates being arranged next to one another and alternately forming inflow channels and outflow channels for the exhaust gas flow.

7. The particle filter as claimed in claim 6 wherein the spacer elements are arranged on the filtration plates in such a way that the spacer elements of respective adjacent filtration plates are in mutual contact.

8. The particle filter as claimed in claim 7, wherein the filtration plates have an arrangement with respect to one another such that one inner elevation of one filtration plate comes to lie on the inner depression of an adjacent filtration plate, or an outer depression of one filtration plate comes to lie on the outer elevation of an adjacent filtration plate.

9. The filtration plate according to claim 1, wherein:
a plurality of spacer elements are formed in said surface region of said filtration plate; and
said spacer elements define a plurality of nonparallel paths across said surface region, around said spacer elements.

10. The filtration plate according to claim 3, wherein:
a plurality of spacer elements are formed in said surface region of said filtration plate; and
said spacer elements define a plurality of nonparallel paths across said surface region, around said spacer elements.

* * * * *